(12) United States Patent
Henry (10) Patent No.: US 12,304,648 B2
(45) Date of Patent: May 20, 2025

(54) SYSTEM AND METHOD FOR SEPARATING AVIONICS CHARTS INTO A PLURALITY OF DISPLAY PANELS

(71) Applicant: Rockwell Collins, Inc., Cedar Rapids, IA (US)

(72) Inventor: Jeff M. Henry, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 347 days.

(21) Appl. No.: 17/525,184

(22) Filed: Nov. 12, 2021

(65) Prior Publication Data

US 2023/0150686 A1    May 18, 2023

Related U.S. Application Data

(60) Provisional application No. 63/278,576, filed on Nov. 12, 2021.

(51) Int. Cl.
| | |
|---|---|
| *G06F 16/954* | (2019.01) |
| *B64D 43/00* | (2006.01) |
| *G06T 17/05* | (2011.01) |
| *G08G 5/21* | (2025.01) |
| *G08G 5/30* | (2025.01) |
| *G09B 29/00* | (2006.01) |

(52) U.S. Cl.
CPC ............ *B64D 43/00* (2013.01); *G08G 5/21* (2025.01); *G08G 5/30* (2025.01)

(58) Field of Classification Search
None
See application file for complete search history.

(56) References Cited

U.S. PATENT DOCUMENTS

| | | | |
|---|---|---|---|
| 3,522,586 | A | 8/1970 | Kiji et al. |
| 3,656,178 | A | 4/1972 | Maine et al. |
| 4,096,527 | A | 6/1978 | Furuta |
| 4,736,303 | A | 4/1988 | Itoh et al. |

(Continued)

FOREIGN PATENT DOCUMENTS

| | | |
|---|---|---|
| CA | 3095088 C | 2/2021 |
| CN | 1045835 C | 10/1999 |

(Continued)

OTHER PUBLICATIONS

Anonymous: "Pilot's Guide to Foreflight Mobile 82nd Edition Covers ForeFlight Mobile v12.7", Aug. 26, 2020, pp. 161-165.

(Continued)

*Primary Examiner* — Adam D Tissot
*Assistant Examiner* — Michael T Silva
(74) *Attorney, Agent, or Firm* — Suiter Swantz IP (57) ABSTRACT

A method for separating avionics charts into a plurality of display panels is disclosed. The method may include receiving chart data for a virtual avionics chart. The method may include determining whether the received chart data exceeds a predetermined threshold. The method may include generating a plurality of display panels if the received chart data exceeds the predetermined threshold. The method may include determining one or more buffer lengths for the generated plurality of display panels. The method may include generating a plurality of output files based on the generated plurality of display panels and the determined one or more buffer lengths.

13 Claims, 6 Drawing Sheets

(56) References Cited

U.S. PATENT DOCUMENTS

| | | |
|---|---|---|
| 4,792,981 A | 12/1988 | Cahill, III et al. |
| 4,876,651 A | 10/1989 | Dawson et al. |
| 5,050,230 A | 9/1991 | Jones et al. |
| 5,428,692 A | 6/1995 | Kuehl |
| 5,454,076 A | 9/1995 | Cain et al. |
| 5,499,382 A | 3/1996 | Nusinov et al. |
| 5,537,669 A | 7/1996 | Evans et al. |
| 5,546,572 A | 8/1996 | Seto et al. |
| 5,559,707 A | 9/1996 | DeLorme et al. |
| 5,577,170 A | 11/1996 | Karow |
| 5,917,436 A | 6/1999 | Endo et al. |
| 5,936,637 A | 8/1999 | Seto |
| 5,978,715 A | 11/1999 | Briffe et al. |
| 6,014,133 A | 1/2000 | Yamakado et al. |
| 6,240,341 B1 | 5/2001 | Snyder |
| 6,275,610 B1 | 8/2001 | Hall, Jr. et al. |
| 6,320,984 B1 | 11/2001 | Shigeta |
| 6,336,074 B1 | 1/2002 | Woo |
| 6,448,922 B1 | 9/2002 | Kelly |
| 6,501,441 B1 | 12/2002 | Udtke et al. |
| 6,757,445 B1 | 6/2004 | Knopp |
| 6,839,714 B2 | 1/2005 | Wheeler et al. |
| 6,922,703 B1 | 7/2005 | Snyder et al. |
| 7,039,505 B1 | 5/2006 | Southard et al. |
| 7,096,211 B2 | 8/2006 | Fujihara |
| 7,173,738 B2 | 2/2007 | Kohn |
| 7,552,010 B2 | 6/2009 | Saito |
| 7,552,011 B2 | 6/2009 | Ishii et al. |
| 7,562,289 B2 | 7/2009 | Bufkin et al. |
| 7,581,036 B2 | 8/2009 | Powell et al. |
| 7,609,263 B2 | 10/2009 | Nagasaki et al. |
| 7,739,622 B2 | 6/2010 | DeLine et al. |
| 7,777,749 B2 | 8/2010 | Chung et al. |
| 7,948,502 B2 | 5/2011 | Stanton |
| 7,966,609 B2 | 6/2011 | Serebryany |
| 8,035,642 B2 | 10/2011 | Suzuki |
| 8,134,362 B1 | 3/2012 | Hullender et al. |
| 8,165,732 B2 | 4/2012 | Corbefin et al. |
| 8,169,505 B2 | 5/2012 | Hoshi |
| 8,306,745 B1 | 11/2012 | Clark et al. |
| 8,339,417 B2 | 12/2012 | Stroila et al. |
| 8,374,390 B2 | 2/2013 | Stroila et al. |
| 8,379,065 B2 | 2/2013 | Nam et al. |
| 8,453,060 B2 | 5/2013 | Ofek et al. |
| 8,515,658 B1 | 8/2013 | Foster et al. |
| 8,583,368 B1 | 11/2013 | Sindlinger et al. |
| 8,704,732 B2 | 4/2014 | Pourbigharaz et al. |
| 8,799,799 B1 | 8/2014 | Cervelli et al. |
| 8,878,872 B1 | 11/2014 | Raghu et al. |
| 8,937,737 B2 | 1/2015 | Tsutsumi et al. |
| 9,035,969 B2 | 5/2015 | Ivashin et al. |
| 9,111,397 B2 | 8/2015 | Kalai et al. |
| 9,195,637 B2 | 11/2015 | Peraza et al. |
| 9,247,133 B2 | 1/2016 | Doepke et al. |
| 9,430,195 B2 | 8/2016 | Pecoraro et al. |
| 9,443,433 B1 | 9/2016 | Conway et al. |
| 9,465,513 B2 | 10/2016 | Sims |
| 9,489,121 B2 | 11/2016 | Davis et al. |
| 9,547,727 B2 | 1/2017 | Passani et al. |
| 9,619,919 B1 | 4/2017 | Postnikov et al. |
| 9,635,313 B2 | 4/2017 | Hasegawa et al. |
| 9,639,309 B1 | 5/2017 | Pugh |
| 9,671,935 B2 | 6/2017 | Miichi et al. |
| 9,682,784 B1 | 6/2017 | Wiebers |
| 9,703,455 B2 | 7/2017 | Cocco et al. |
| 9,781,294 B1 | 10/2017 | Chapman |
| 9,818,051 B2 | 11/2017 | Panek et al. |
| 9,858,823 B1 | 1/2018 | Lynn et al. |
| 9,891,875 B2 | 2/2018 | Kim et al. |
| 9,921,721 B2 | 3/2018 | Beavers et al. |
| 9,939,271 B1 | 4/2018 | Foster et al. |
| 10,001,376 B1 | 6/2018 | Tiana et al. |
| 10,061,480 B1 | 8/2018 | McCusker et al. |
| 10,170,010 B1 | 1/2019 | McCusker et al. |
| 10,277,869 B2 | 4/2019 | Kim |
| 10,297,159 B2 | 5/2019 | Srivastav et al. |
| 10,372,292 B2 | 8/2019 | Vogel et al. |
| 10,579,187 B2 | 3/2020 | Takahashi et al. |
| 10,598,780 B2 | 3/2020 | Bellett et al. |
| 10,664,510 B1 | 5/2020 | Hochmuth et al. |
| 10,674,075 B2 | 6/2020 | Kimura |
| 10,684,769 B2 | 6/2020 | Yamat et al. |
| 10,872,274 B2 | 12/2020 | Mao et al. |
| 10,880,522 B2 | 12/2020 | McCutchen et al. |
| 10,984,501 B2 | 4/2021 | Milan et al. |
| 11,030,477 B2 | 6/2021 | Becker et al. |
| 11,061,563 B1 | 7/2021 | Nielsen et al. |
| 11,106,329 B2 | 8/2021 | He et al. |
| 11,334,543 B1 | 5/2022 | Anwar et al. |
| 11,885,623 B1 | 1/2024 | Goldstein |
| 2001/0015759 A1 | 8/2001 | Squibbs |
| 2003/0151630 A1 | 8/2003 | Kellman et al. |
| 2004/0056883 A1 | 3/2004 | Wierowski |
| 2004/0071351 A1 | 4/2004 | Rade |
| 2004/0225440 A1 | 11/2004 | Khatwa et al. |
| 2004/0225635 A1 | 11/2004 | Toyama et al. |
| 2005/0010359 A1 | 1/2005 | Qureshi |
| 2005/0030321 A1 | 2/2005 | Anwar |
| 2005/0091340 A1 | 4/2005 | Facemire et al. |
| 2005/0264577 A1 | 12/2005 | Blais |
| 2006/0031006 A1 | 2/2006 | Stenbock et al. |
| 2006/0167629 A1 | 7/2006 | Ishii et al. |
| 2006/0215915 A1 | 9/2006 | Kim |
| 2007/0067095 A1 | 3/2007 | King |
| 2007/0094591 A1 | 4/2007 | Etgen et al. |
| 2007/0112517 A1 | 5/2007 | Goldstein |
| 2007/0132767 A1 | 6/2007 | Wright et al. |
| 2007/0185651 A1 | 8/2007 | Motoyama et al. |
| 2007/0211151 A1 | 9/2007 | Baiping et al. |
| 2007/0268313 A1 | 11/2007 | Dolph et al. |
| 2008/0045138 A1 | 2/2008 | Milic-Frayling et al. |
| 2008/0046254 A1 | 2/2008 | Nuno et al. |
| 2008/0103641 A1 | 5/2008 | Ratcliffe |
| 2008/0125960 A1 | 5/2008 | Wipplinger et al. |
| 2008/0172627 A1 | 7/2008 | Hagawa et al. |
| 2008/0192053 A1 | 8/2008 | Howell et al. |
| 2008/0240152 A1 | 10/2008 | Quinn et al. |
| 2009/0080801 A1 | 3/2009 | Hatfield et al. |
| 2009/0089660 A1 | 4/2009 | Atkins et al. |
| 2009/0123070 A1* | 5/2009 | Xiaoying ................ G06T 7/174 382/176 |
| 2009/0125837 A1 | 5/2009 | Hatem et al. |
| 2009/0172035 A1 | 7/2009 | Lessing et al. |
| 2009/0210388 A1 | 8/2009 | Elson et al. |
| 2009/0324065 A1 | 12/2009 | Ishida et al. |
| 2010/0128020 A1 | 5/2010 | Oh et al. |
| 2010/0185984 A1 | 7/2010 | Wright et al. |
| 2010/0194783 A1 | 8/2010 | Kanamaru et al. |
| 2010/0218089 A1 | 8/2010 | Chao et al. |
| 2010/0262318 A1 | 10/2010 | Ariens |
| 2010/0328353 A1 | 12/2010 | McDonald et al. |
| 2011/0043539 A1 | 2/2011 | Hiroki |
| 2011/0122153 A1 | 5/2011 | Okamura et al. |
| 2011/0187741 A1 | 8/2011 | Akiya et al. |
| 2011/0191014 A1 | 8/2011 | Feng et al. |
| 2012/0010765 A1 | 1/2012 | Wilson et al. |
| 2012/0019673 A1 | 1/2012 | Narayanan |
| 2012/0113475 A1 | 5/2012 | Sugiyama |
| 2012/0123680 A1 | 5/2012 | Wipplinger et al. |
| 2012/0233542 A1 | 9/2012 | Funakoshi |
| 2012/0242687 A1 | 9/2012 | Choi |
| 2012/0287151 A1* | 11/2012 | James .................... G09G 5/005 345/628 |
| 2013/0009891 A1 | 1/2013 | Watanabe et al. |
| 2013/0159825 A1 | 6/2013 | Nishio et al. |
| 2013/0204880 A1 | 8/2013 | Lesiecki et al. |
| 2014/0104246 A1* | 4/2014 | Rao .................... G02F 1/13336 345/1.3 |
| 2014/0109012 A1 | 4/2014 | Choudhary et al. |
| 2014/0168277 A1 | 6/2014 | Ashley et al. |
| 2014/0225928 A1 | 8/2014 | Konnola et al. |
| 2014/0229861 A1 | 8/2014 | Hellstrom |
| 2014/0247268 A1 | 9/2014 | Drucker et al. |
| 2014/0282038 A1 | 9/2014 | Royster et al. |

(56) References Cited

U.S. PATENT DOCUMENTS

| | | |
|---|---|---|
| 2014/0310655 A1 | 10/2014 | Sims |
| 2014/0337816 A1 | 11/2014 | Chiluvuri |
| 2015/0070356 A1 | 3/2015 | Da Veiga et al. |
| 2015/0070373 A1 | 3/2015 | Clinton |
| 2015/0139524 A1 | 5/2015 | Choi |
| 2015/0193648 A1 | 7/2015 | Hasegawa et al. |
| 2015/0227405 A1 | 8/2015 | Jan et al. |
| 2015/0239574 A1 | 8/2015 | Ball et al. |
| 2015/0278626 A1 | 10/2015 | Nakamura |
| 2015/0324088 A1 | 11/2015 | Pasetto et al. |
| 2015/0352952 A1 | 12/2015 | Kneuper et al. |
| 2016/0092557 A1 | 3/2016 | Stojanovic et al. |
| 2016/0293017 A1 | 10/2016 | Whelan |
| 2016/0299905 A1 | 10/2016 | Geyer et al. |
| 2017/0011064 A1 | 1/2017 | Mercer et al. |
| 2017/0046962 A1 | 2/2017 | Shipley et al. |
| 2017/0124734 A1 | 5/2017 | Gowda |
| 2017/0241798 A1 | 8/2017 | Van Den Bergh et al. |
| 2017/0262413 A1 | 9/2017 | Song et al. |
| 2017/0287170 A1 | 10/2017 | Perona et al. |
| 2017/0299633 A1 | 10/2017 | Pietrowicz et al. |
| 2017/0301117 A1 | 10/2017 | Lanza |
| 2017/0301118 A1 | 10/2017 | Lanza et al. |
| 2017/0313332 A1 | 11/2017 | Paget et al. |
| 2018/0007137 A1 | 1/2018 | Watson et al. |
| 2018/0025059 A1 | 1/2018 | Batchu et al. |
| 2018/0174588 A1 | 6/2018 | Agarwal et al. |
| 2018/0181646 A1 | 6/2018 | Balasa et al. |
| 2018/0253889 A1 | 9/2018 | Nagasaka |
| 2018/0262884 A1 | 9/2018 | Hosier, Jr. |
| 2018/0301111 A1 | 10/2018 | Park et al. |
| 2018/0329927 A1 | 11/2018 | Garg et al. |
| 2019/0057671 A1 | 2/2019 | Baer et al. |
| 2019/0220234 A1 | 7/2019 | Lewis et al. |
| 2019/0237043 A1 | 8/2019 | Tahmasebi |
| 2019/0272618 A1 | 9/2019 | Boyce et al. |
| 2019/0299701 A1 | 10/2019 | Bartels |
| 2020/0013491 A1 | 1/2020 | Carter et al. |
| 2020/0050586 A1 | 2/2020 | Pal et al. |
| 2020/0066017 A1 | 2/2020 | Kawachi et al. |
| 2020/0089694 A1* | 3/2020 | Cabra ............... G06T 17/05 |
| 2020/0097283 A1 | 3/2020 | Coccia |
| 2020/0192872 A1 | 6/2020 | Quinn |
| 2020/0195924 A1 | 6/2020 | Hsiang |
| 2020/0251029 A1 | 8/2020 | Tseng |
| 2020/0252594 A1 | 8/2020 | Lee et al. |
| 2020/0255350 A1 | 8/2020 | Baek |
| 2020/0320142 A1 | 10/2020 | Malak et al. |
| 2020/0320884 A1 | 10/2020 | Hillier et al. |
| 2020/0386567 A1 | 12/2020 | Igarashi |
| 2020/0401263 A1* | 12/2020 | Chung ............... G06F 1/1647 |
| 2021/0004930 A1 | 1/2021 | Kamath et al. |
| 2021/0035453 A1 | 2/2021 | Khan et al. |
| 2021/0056300 A1 | 2/2021 | Chitta et al. |
| 2021/0150088 A1 | 5/2021 | Gallo et al. |
| 2021/0184758 A1 | 6/2021 | Barritt et al. |
| 2021/0192202 A1 | 6/2021 | Tripuraneni et al. |
| 2021/0206459 A1 | 7/2021 | Johnson et al. |
| 2021/0208779 A1 | 7/2021 | Nielsen et al. |
| 2021/0225181 A1 | 7/2021 | Feyereisen et al. |
| 2021/0312351 A1 | 10/2021 | Pourmohammad et al. |
| 2021/0349615 A1 | 11/2021 | Ruby et al. |
| 2022/0018972 A1 | 1/2022 | Bennington et al. |
| 2022/0082404 A1 | 3/2022 | Barre et al. |
| 2022/0139238 A1* | 5/2022 | Teague ............. G01S 13/953 701/14 |
| 2022/0197961 A1 | 6/2022 | Baek et al. |
| 2023/0150685 A1 | 5/2023 | Peters et al. |
| 2023/0150686 A1 | 5/2023 | Henry |
| 2023/0154338 A1 | 5/2023 | Henry et al. |
| 2023/0154341 A1 | 5/2023 | Peters et al. |
| 2023/0169625 A1 | 6/2023 | Kumar et al. |

FOREIGN PATENT DOCUMENTS

| | | |
|---|---|---|
| CN | 100440222 C | 12/2008 |
| CN | 101751449 A | 6/2010 |
| CN | 101676988 B | 12/2011 |
| CN | 102714759 B | 10/2016 |
| CN | 107026958 A | 8/2017 |
| CN | 107402734 A | 11/2017 |
| CN | 109325083 A | 2/2019 |
| CN | 110727747 A | 1/2020 |
| CN | 110906938 A | 3/2020 |
| EP | 0341645 A2 | 11/1989 |
| EP | 0380294 A1 | 8/1990 |
| EP | 0748562 A1 | 10/1998 |
| EP | 1352315 A2 | 10/2003 |
| EP | 1366462 A2 | 12/2003 |
| EP | 1454213 A2 | 9/2004 |
| EP | 1272977 B1 | 12/2004 |
| EP | 1687777 A2 | 8/2006 |
| EP | 2224359 A2 | 9/2010 |
| EP | 2792998 A2 | 10/2014 |
| EP | 2879061 A2 | 6/2015 |
| EP | 1736894 A4 | 7/2016 |
| EP | 3201879 A1 | 8/2017 |
| EP | 3538978 A4 | 8/2020 |
| EP | 3845862 A1 | 7/2021 |
| GB | 2504085 A | 1/2014 |
| JP | S622721 A | 1/1987 |
| JP | S62196772 A | 8/1987 |
| JP | S6393273 A | 4/1988 |
| JP | H05205069 A | 8/1993 |
| JP | 3871040 B2 | 1/2007 |
| JP | 2007133231 A | 5/2007 |
| JP | 2008022215 A | 1/2008 |
| JP | 2009282855 A | 12/2009 |
| JP | 4728744 B2 | 7/2011 |
| WO | 9523364 A2 | 8/1995 |
| WO | 1998043208 A3 | 1/1999 |
| WO | 2011036499 A1 | 3/2011 |
| WO | 2014146561 A1 | 9/2014 |
| WO | 2021035223 A1 | 2/2021 |
| WO | 2021035954 A1 | 3/2021 |

OTHER PUBLICATIONS

Anonymous: Pilot's Guide to Foreflight Mobile 82nd Edition Covers ForeFlight Mobile v12.7, Aug. 26, 2020, pp. 78-90.

Extended European Search Report dated Apr. 5, 2023, European Application No. 22207025.2.

Extended European Search Report dated Apr. 5, 2023, European Application No. 22207047.6.

Extended European Search Report dated Apr. 5, 2023; European Application No. 22207057.5.

Extended European Search Report dated Mar. 24, 2023; European Application No. 22207029.4.

Anonymous: "algorithm-Contour of a run-length-coded digital shape", Stack Overflow, Dec. 31, 2015, pp. 1-5, URL:https://stackoverflow.com/questions/32354807/contour-of-a-run-length-coded-digital-shape.

Seo et al., "Fast Contour-Tracing Algorithm Based on a Pixel-Following Method for Image Sensors", Sensors, MPDI (Year: 2016).

ArcGIS, "Introduction to export a map or layout", retrieved from the Internet Nov. 11, 2021.

Bongwon Suh, Haibin Ling, Benjamin B. Bederson, and David W. Jacobs. 2003. Automatic thumbnail cropping and its effectiveness. In Proceedings of the 16th annual ACM symposium on User interface software and technology (UIST 03). Association for Computing Machinery, New York, NY, USA, 95-104.

Houston, Ben & Nielsen, Michael & Batty, Christopher & Nilsson, Ola & Museth, Ken. (2006). Hierarchical RLE Level Set: A compact and versatile deformable surface representation. ACM Trans. Graph.. 25. 151-175.

Jeppesen, "JeppView for Windows, User Guide", (2016), 92 pages.

Lufthanasa Systems Blog, "Lido eRouteManual 4.3 Design Overview", (2016) Retrieved from the Internet.

(56) References Cited

OTHER PUBLICATIONS

Maptiler, "Software performs Geocoding, Place name search, and Reverse Geocoding." Retrieved from Internet on Nov. 11, 2021.
Microsoft, "Generate a thumbnail sprite with Azure Media Services", (2021), Retrieved from Internet Nov. 11, 2021.
Narkive Mailinglist Archive, "Fastest Method of Drawing a TileMap", (2002), Retrieved from Internet Nov. 11, 2021.
Navigraph, "Navigraph Charts", Retrieved from the Internet.
Pamental, Jason, "Digging in to dynamic typography", Retrieved from Internet , Nov. 11, 2021, 11 pages.
Pamental, Jason, "The evolution of typography with variable fonts", Retrieved from the Internet , Nov. 11, 2021.
Penquerch, "[AD] RLE clipping speedup patch" (2002), Retrieved from Internet , Nov. 11, 2021.
QGIS: Open-source cross-platform GIS software, Retrieved from Internet , Nov. 11, 2021.
Somasundaram, K. "A Method for Filling Holes in Objects of Medical Images Using Region Labeling and Run Length Encoding Schemes." (2010).
Extended European Search Report dated Apr. 21, 2023; European Application No. 22207060.9.
Extended European Search Report dated Jun. 13, 2023; European Application No. 22206954.4.
Neupane Prasanga et al: "Extracting Unknown Repeated Pattern in Tiled Images: 19th International Conference on Hybrid Intelligent Systems (HIS 2019) held in Bhopal, India, Dec. 10-12, 2019" In: Intelligent Autonomous Systems 13, International Publishing, Cham, vol. 1179, pp. 92-102.
Yang Y. et al: "Vectorization of Linear Features in Scanned Topographic Maps Using Adaptive Image Segmentation and Sequential Line Tracking", The International Archives of the Photogrammetry, Remote Sensing and Spatial Information Sciences, vol. XXXIX-B4, Aug. 25, 2012, pp. 103-108.
Extended European Search Report dated Apr. 11, 2023; European Application No. 22207049.2.
Extended European Search Report dated Apr. 4, 2023; European Application No. 22207012.0.
Extended European Search Report dated Apr. 5, 2023; European Application No. 22207019.5.
Hatlapatka Radim: "JBIG2 Supported by OCR", EUDML Jul. 9, 2012, pp. 1-9.
Shang Junqing et al: "JBIG2 text image compression based on OCR", Proceedings of the SPIE, vol. 6067, Jan. 15, 2006, p. 6067D.
Anonymous: "SkyDemon Mobile, GBS handheld navigation devices for aircrfaft", Dec. 4, 2021; Internet URL https://web.archive.org/web/20211204140934/https://www.skydemon.aero/inflight/.
C. Pschierer et al, "Human factors analysis for a 2D enroute moving map application", SPIE, PO Box 10, Bellingham, WA 98227-0010 USA, vol. 5802, May 25, 2005.
Extended European Search Report dated Apr. 11, 2023; European Application No. 22207123.5.
Extended European Search Report dated Apr. 12, 2023; European Application No. 22207050.0.
Extended European Search Report dated Apr. 12, 2023; European Application No. 22207124.3.
Extended European Search Report dated Apr. 18, 2023; European Application No. 22207164.9.
Rockwell Collins: "Flight Database Services for Pro Line Fusion", Jan. 12, 2021, XP093035870, Internet URL: https://www.rockwellcollins.com/-/media/files/unsecure/products/product-brochures/navigation-and-guidance/flight-management-systems/resources/fusion-data-base-services-01.pdf?la=en&lastupdate=20210125195039&csrt=15271691716207860418, p. 5.
Skysectionals: "Tour Low-Altitude Enroute Charts", Sep. 22, 2021; XP093035866, Internet: URL:https://web.archive.org/web/20210922184910/https://skysectionals.com/tour-enroute/.
Stephen Dubet; Institute of Electrical and Electronics Engineers: "Aeronautical charts for electronic flight bags", 22nd. DASC. The 22nd Digital Avionics Systems Conference Proceedings. Indianapolis, IN Oct. 12-16, 2003. vol. 2, pp. 13_D_1_1_13_D_1_9, XP010669024.
Schouten, Tjeerd, Real time EFIS vector graphics, Bit Barrel Media, available at https://bitbarrelmedia.wordpress.com/2017/11/01/real-time-efis-vector-graphics/ (Nov. 11, 2017).
IDR Solutions, "How to Convert PDF to SVG in 1 minute," http://www.youtube.com/watch?v=VoyjqGIrHGk, Mar. 17, 2021.
IFR Enroute Aeronautical Charts and Planning, Federal Aviation Administration (FAA), available at https://web.archive.org/web/20211025202857/https://www.faa.gov/air_traffic/flight_info/aeronav/digital_products/ifr/ (archived Oct. 25, 2017).
European Patent Office, Examination Report received in EP Application No. 22206954.4, Feb. 17, 2025, 8 pages.
European Patent Office, Examination Report received in EP Application No. 22207047.6, Jan. 14, 2025, 8 pages.

* cited by examiner

SYSTEM AND METHOD FOR SEPARATING AVIONICS CHARTS INTO A PLURALITY OF DISPLAY PANELS

CROSS-REFERENCE TO RELATED APPLICATIONS

The present disclosure claims the benefit under 35 U.S.C. § 119(e) of U.S. Provisional Application Ser. No. 63/278,576, filed Nov. 12, 2021, entitled SYSTEMS AND METHODS FOR GENERATION, SELECTION, AND DISPLAY OF MAP-BASED CHART DATABASES FOR USE WITH CERTIFIED AVIONICS SYSTEMS, naming Jeff M. Henry, Kyle R. Peters, Todd E. Miller, Jason L. Wong, Reed A. Kovach, and Srinath Nandakumar as inventor, which is incorporated herein by reference in the entirety.

BACKGROUND

Avionics display systems often do not have ample data storage space available to store avionics chart data. There is a need for a system and method for lowering the individual chart data size.

SUMMARY

A method for separating avionics charts into a plurality of display panels is disclosed, in accordance with one or more embodiments of the present disclosure. The method includes receiving chart data for a virtual avionics chart. The method includes determining whether the received chart data exceeds a predetermined threshold. The method includes generating a plurality of display panels if the received chart data exceeds the predetermined threshold. The method includes determining one or more buffer lengths for the generated plurality of display panels. The method includes generating a plurality of output files based on the generated plurality of display panels and the determined one or more buffer lengths.

In some embodiments, the method may include providing the plurality of output files to an on-board aircraft controller for display on one or more display devices of an aircraft.

In some embodiments, the determine whether the received chart data exceeds a predetermined threshold may include comparing a data size of the received chart data to a predetermined data size threshold.

In some embodiments, the predetermined data size threshold may be between 1.2 Mb and 1.5 Mb.

In some embodiments, the predetermined data size threshold may be 1.3 Mb.

In some embodiments, the generate a plurality of display panels if the received chart data exceeds the predetermined threshold may further include determining one or more fold locations; determining one or more fold sizes; and assigning one or more fold numbers to one or more sections based on at least one of one or more x-values or one or more y-values.

In some embodiments, the one or more buffer lengths may be 1.00 inches.

In some embodiments, the method may further include determining whether chart data of the generated plurality of output files exceeds a predetermined threshold and adjusting a fold size of the one or more display panels if the chart data of the generated plurality of output files for the one or more display panels exceeds the predetermined threshold.

A system for separating avionics charts into a plurality of display panels is disclosed, in accordance with one or more embodiments of the present disclosure. The system includes one or more controllers including one or more processors configured to execute a set of program instructions stored in a memory, the set of program instructions configured to cause the one or more processors to: receive chart data for a virtual avionics chart; determine whether the received chart data exceeds a predetermined threshold; generate a plurality of display panels if the received chart data exceeds the predetermined threshold; determine one or more buffer lengths for the generated plurality of display panels; and generate a plurality of output files based on the generated plurality of display panels and the determined one or more buffer lengths.

In some embodiments, the one or more controllers may be configured to provide the plurality of output files to an on-board aircraft controller for display on one or more display devices of an aircraft.

In some embodiments, the determine whether the received chart data exceeds a predetermined threshold may include comparing a data size of the received chart data to a predetermined data size threshold.

In some embodiments, the predetermined data size threshold may be between 1.2 Mb and 1.5 Mb.

In some embodiments, the predetermined data size threshold may be 1.3 Mb.

In some embodiments, the generate a plurality of display panels if the received chart data exceeds the predetermined threshold may further include determining one or more fold locations; determining one or more fold sizes; and assigning one or more fold numbers to one or more sections based on at least one of one or more x-values or one or more y-values.

In some embodiments, the method may further include determining whether chart data of the generated plurality of output files exceeds a predetermined threshold and adjusting a fold size of the one or more display panels if the chart data of the generated plurality of output files for the one or more display panels exceeds the predetermined threshold.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Reference will now be made in detail to the subject matter disclosed, which is illustrated in the accompanying drawings.

Before explaining one or more embodiments of the present disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the present disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-5 generally illustrate a system and method for separating avionics charts into a plurality of display panels, in accordance with one or more embodiments of the present disclosure.

Aeronautical charts (or avionics charts) are widely used for air navigation. The Federal Aviation Administration (FAA) publishes charts for each stage of Visual Flight Rules (VFR) and Instrument Flight Rules (IFR) air navigation including training, planning, and departures, enroute (for low and high altitudes), approaches, and taxiing charts. These charts are frequently updated by the FAA. For example, the charts may be updated about once a month. As such, a pilot must ensure that they have the most-up-to-date charts on-board when flying.

In general, enroute charts provide aeronautical information for enroute instrument navigation. High altitude enroute charts are used to provide information for navigation at or above 18,000 ft MSL, while low altitude enroute charts are used to below information for navigation below 18,000 ft MSL. For example, high altitude enroute charts include jet and RNAV routes, identification and frequency of radio aids, selected airports, distances, time zones, special use air space, and the like. By way of another example, low altitude enroute charts include information regarding airports, NAVAIDs, communications, air traffic services, airspace, and the like. In general, these enroute charts are large in both physical size and chart data size.

Avionics display systems often do not have ample data storage space available on the display hardware to store the data for each aeronautical chart. For example, there may be about approximately 1.3 Mb of available space in the display hardware (which is the upper limit that can be displayed at one time) and a given chart may be greater than 1.3 Mb (e.g., 25 Mb). Therefore, there is a need for a system and method for lowering the individual chart size, such that the system is able to display the chart.

As such, it would be desirable to provide a system and method for separating large avionics charts into multiple display panels. The system and method should allow charts to be processed off-line, such that the avionic resources have the bandwidth to display the processed charts during runtime. For example, the system and method may be configured to systematically break up the avionics charts into a plurality of panels to display on multiple display panels. By way of another example, the system and method may be configured to allow for overlapping panels to minimize panel swapping along the edges. By way of another example, the system and method may be configured to allow for program variance in choosing panel and buffer sizes. By way of another example, the system and method may be configured to modify the coordinates of the chart display items to new locations based on the panel boundaries (e.g., items outside the defined section are discarded, items that span sections are modified, and the like). By way of another example, the system and method may be configured to modify clip structures to the new boundaries (e.g., items outside the defined section are discarded, items that span sections are modified, or the like). By way of another example, the system and method may be configured to create new structures based on new boundaries by reassembling the modified lines and clip structures, such that each panel may be processed as an individual chart.

Figure 1A:
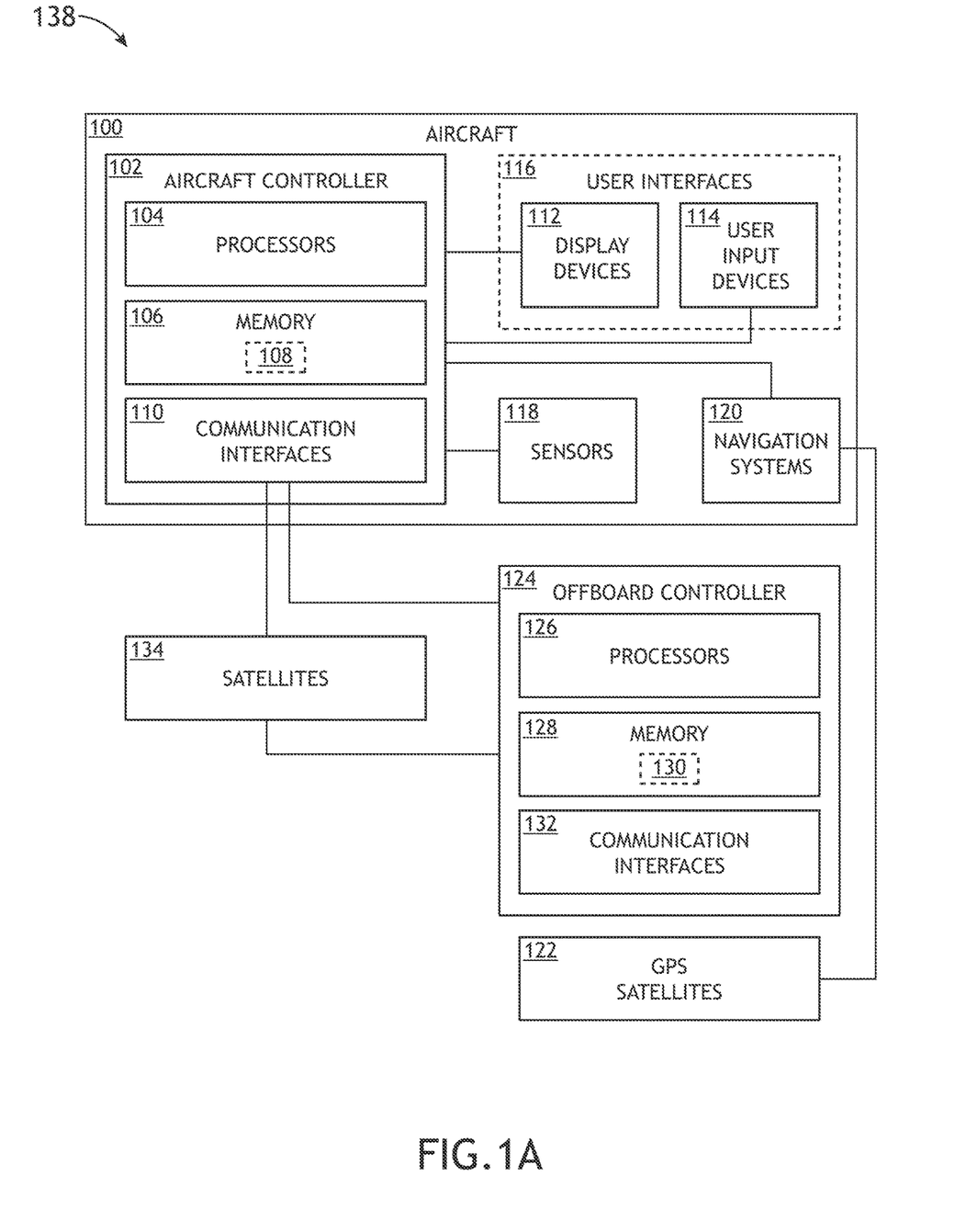
FIG. 1A illustrates a simplified block diagram of an aircraft including the system for separating avionics charts into a plurality of display panels, in accordance with one or more embodiments of the present disclosure.
Figure 1B:
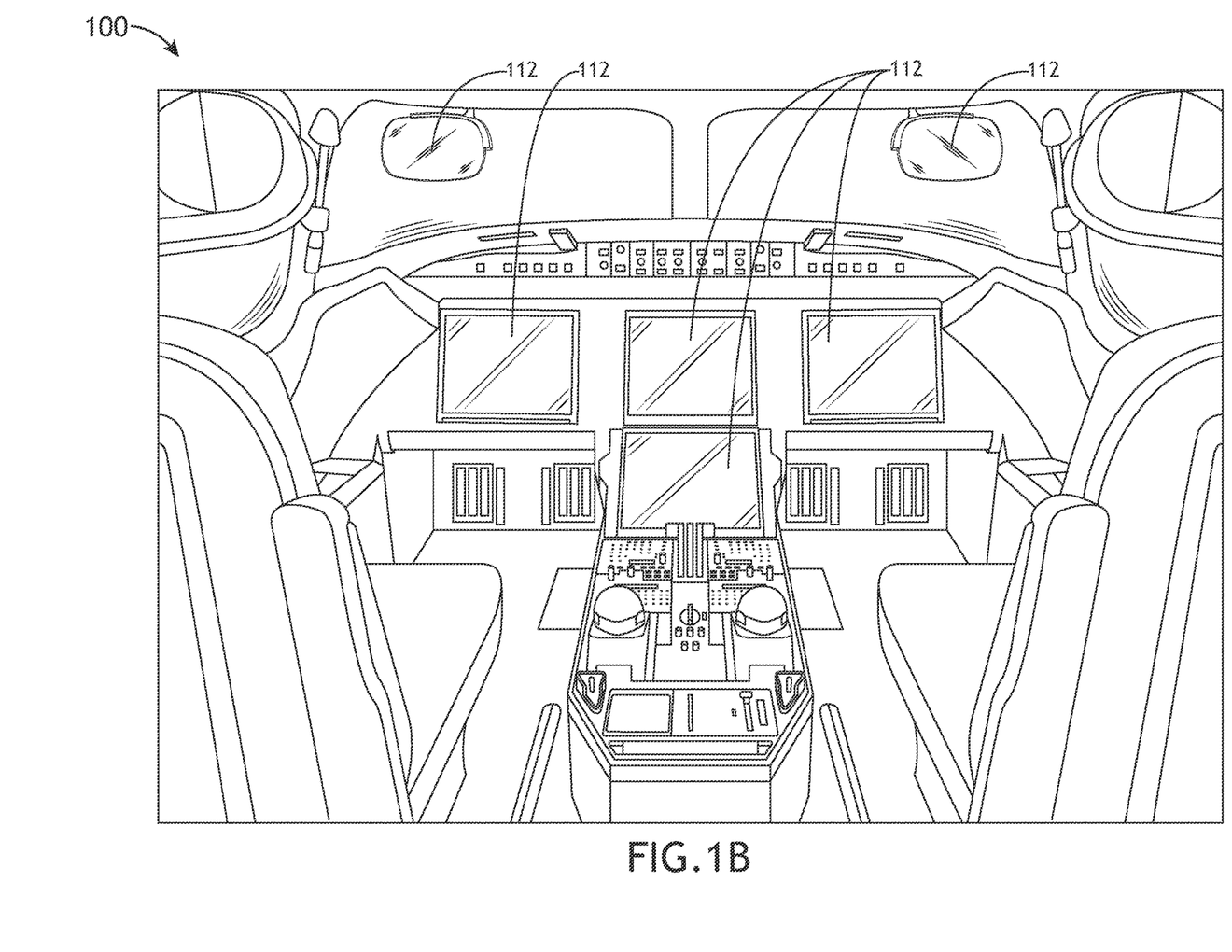
FIG. 1B illustrates an aircraft including the system for separating avionics charts into a plurality of display panels, in accordance with one or more embodiments of the present disclosure.

FIGS. 1A-1B illustrate an aircraft including a system for separating avionics charts into a plurality of display panels, in accordance with one or more embodiments of the present disclosure.

Referring now to FIG. 1A, the aircraft 100 may include an aircraft controller 102 (e.g., on-board/run-time controller). The aircraft controller 102 may include one or more processors 104, memory 106 configured to store one or more program instructions 108, and/or one or more communication interfaces 110.

The aircraft 100 may include an avionics environment such as, but not limited to, a cockpit. The aircraft controller 102 may be coupled (e.g., physically, electrically, and/or communicatively) to one or more display devices 112. The one or more display devices 112 may be configured to display three-dimensional images and/or two-dimensional images. Referring now to FIG. 1B, the avionics environment (e.g., the cockpit) may include any number of display devices 112 (e.g., one, two, three, or more displays) such as, but not limited to, one or more head-down displays (HDDs) 112, one or more head-up displays (HUDs) 112, one or more multi-function displays (MFDs), one or more adaptive flight displays (AFDs) 112, one or more primary flight displays (PFDs) 112, or the like. The one or more display devices 112 may be employed to present flight data including, but not limited to, situational awareness data (e.g., chart data) and/or flight queue data to a pilot or other crew member. For example, the situational awareness data (e.g., chart data) may be based on, but is not limited to, aircraft performance parameters, aircraft performance parameter predictions, sensor readings, alerts, or the like.

Referring again to FIG. 1A, the aircraft controller 102 may be coupled (e.g., physically, electrically, and/or communicatively) to one or more user input devices 114. The one or more display devices 112 may be coupled to the one or more user input devices 114. For example, the one or more display devices 112 may be coupled to the one or more user input devices 114 by a transmission medium that may include wireline and/or wireless portions. The one or more display devices 112 may include and/or be configured to interact with one or more user input devices 114.

The one or more display devices 112 and the one or more user input devices 114 may be standalone components within the aircraft 100. It is noted herein, however, that the one or more display devices 112 and the one or more user input devices 114 may be integrated within one or more common user interfaces 116.

Where the one or more display devices 112 and the one or more user input devices 114 are housed within the one or more common user interfaces 116, the aircraft controller 102, one or more offboard controllers 124, and/or the one or more common user interfaces 116 may be standalone components. It is noted herein, however, that the aircraft controller 102, the one or more offboard controllers 124, and/or the one or more common user interfaces 116 may be integrated within one or more common housings or chassis.

The aircraft controller 102 may be coupled (e.g., physically, electrically, and/or communicatively) to and configured to receive data from one or more aircraft sensors 118. The one or more aircraft sensors 118 may be configured to sense a particular condition(s) external or internal to the aircraft 100 and/or within the aircraft 100. The one or more aircraft sensors 118 may be configured to output data associated with particular sensed condition(s) to one or more components/systems onboard the aircraft 100. Generally, the one or more aircraft sensors 118 may include, but are not limited to, one or more inertial measurement units, one or more airspeed sensors, one or more radio altimeters, one or more flight dynamic sensors (e.g., sensors configured to sense pitch, bank, roll, heading, and/or yaw), one or more weather radars, one or more air temperature sensors, one or more surveillance sensors, one or more air pressure sensors, one or more engine sensors, and/or one or more optical sensors (e.g., one or more cameras configured to acquire images in an electromagnetic spectrum range including, but not limited to, the visible light spectrum range, the infrared spectrum range, the ultraviolet spectrum range, or any other spectrum range known in the art).

The aircraft controller 102 may be coupled (e.g., physically, electrically, and/or communicatively) to and configured to receive data from one or more navigational systems 120. The one or more navigational systems 120 may be coupled (e.g., physically, electrically, and/or communicatively) to and in communication with one or more GPS satellites 122, which may provide vehicular location data (e.g., aircraft location data) to one or more components/systems of the aircraft 100. For example, the one or more navigational systems 120 may be implemented as a global navigation satellite system (GNSS) device, and the one or more GPS satellites 122 may be implemented as GNSS satellites. The one or more navigational systems 120 may include a GPS receiver and a processor. For example, the one or more navigational systems 120 may receive or calculate location data from a sufficient number (e.g., at least four) of GPS satellites 122 in view of the aircraft 100 such that a GPS solution may be calculated.

It is noted herein the one or more aircraft sensors 118 may operate as a navigation device 120, being configured to sense any of various flight conditions or aircraft conditions typically used by aircraft and output navigation data (e.g., aircraft location data, aircraft orientation data, aircraft direction data, aircraft speed data, and/or aircraft acceleration data). For example, the various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure. By way of another example, the one or more aircraft sensors 118 may provide aircraft location data and aircraft orientation data, respectively, to the one or more processors 104, 126.

The aircraft controller 102 of the aircraft 100 may be coupled (e.g., physically, electrically, and/or communicatively) to one or more offboard controllers 124.

The one or more offboard controllers 124 may include one or more processors 126, memory 128 configured to store one or more programs instructions 130 and/or one or more communication interfaces 132.

The aircraft controller 102 and/or the one or more offboard controllers 124 may be coupled (e.g., physically, electrically, and/or communicatively) to one or more satellites 134. For example, the aircraft controller 102 and/or the one or more offboard controllers 124 may be coupled (e.g., physically, electrically, and/or communicatively) to one another via the one or more satellites 134. For instance, at least one component of the aircraft controller 102 may be configured to transmit data to and/or receive data from at least one component of the one or more offboard controllers 124, and vice versa. By way of another example, at least one component of the aircraft controller 102 may be configured to record event logs and may transmit the event logs to at least one component of the one or more offboard controllers 124, and vice versa. By way of another example, at least one component of the aircraft controller 102 may be configured to receive information and/or commands from the at least one component of the one or more offboard controllers 124, either in response to (or independent of) the transmitted event logs, and vice versa.

It is noted herein that the aircraft 100 and the components onboard the aircraft 100, the one or more offboard controllers 124, the one or more GPS satellites 122, and/or the one or more satellites 134 may be considered components of a system 138, for purposes of the present disclosure. The system may be generally discussed in concurrently filed U.S. Patent Publication No. 2023/0154338, published on May 18, 2023, which is incorporated herein by reference in the entirety.

The one or more processors 104, 126 may include any one or more processing elements, micro-controllers, circuitry, field programmable gate array (FPGA) or other processing systems, and resident or external memory for storing data, executable code, and other information accessed or generated by the aircraft controller 102 and/or the one or more offboard controllers 124. In this sense, the one or more processors 104, 126 may include any microprocessor device configured to execute algorithms and/or program instructions. It is noted herein, however, that the one or more processors 104, 126 are not limited by the materials from which it is formed or the processing mechanisms employed therein and, as such, may be implemented via semiconductor(s) and/or transistors (e.g., using electronic integrated circuit (IC) components), and so forth. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

The memory 106, 128 may include any storage medium known in the art suitable for storing the set of program instructions executable by the associated one or more processors. For example, the memory 106, 128 may include a non-transitory memory medium. For instance, the memory 106, 128 may include, but is not limited to, a read-only memory (ROM), a random access memory (RAM), a magnetic or optical memory device (e.g., disk), a magnetic tape, a solid state drive, flash memory (e.g., a secure digital (SD) memory card, a mini-SD memory card, and/or a micro-SD memory card), universal serial bus (USB) memory devices, and the like. The memory 106, 128 may be configured to provide display information to the display device (e.g., the one or more display devices 112). In addition, the memory 106, 128 may be configured to store user input information from a user input device of a user interface. The memory 106, 128 may be housed in a common controller housing with the one or more processors. The memory 106, 128 may, alternatively or in addition, be located remotely with respect to the spatial location of the processors and/or a controller. For instance, the one or more processors and/or the controller may access a remote memory (e.g., server), accessible through a network (e.g., internet, intranet, and the like).

The aircraft controller 102 and/or the one or more offboard controllers 124 may be configured to perform one or more process steps, as defined by the one or more sets of program instructions 108, 130. The one or more process steps may be performed iteratively, concurrently, and/or sequentially. The one or more sets of program instructions 108, 130 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 108, 130 may be configured to operate via proportional control, feedback control, feedforward control, integral control, proportional-derivative (PD) control, proportional-integral (PI) control, proportional-integral-derivative (PID) control, or the like.

The one or more communication interfaces 110, 134 may be operatively configured to communicate with one or more components of the aircraft controller 102 and/or the one or more offboard controllers 124. For example, the one or more communication interfaces 110, 134 may also be coupled (e.g., physically, electrically, and/or communicatively) with the one or more processors 104, 126 to facilitate data transfer between components of the one or more components of the aircraft controller 102 and/or the one or more offboard controllers 124 and the one or more processors 104, 126. For instance, the one or more communication interfaces 110, 134 may be configured to retrieve data from the one or more processors 104, 126, or other devices, transmit data for storage in the memory 106, 128, retrieve data from storage in the memory 106, 128, or the like. By way of another example, the aircraft controller 102 and/or the one or more offboard controllers 124 may be configured to receive and/or acquire data or information from other systems or tools by a transmission medium that may include wireline and/or wireless portions. By way of another example, the aircraft controller 102 and/or the one or more offboard controllers 124 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 102 and/or the one or more offboard controllers 124 and the other subsystems (e.g., of the aircraft 100 and/or the system 138). In addition, the aircraft controller 102 and/or the one or more offboard controllers 124 may be configured to send data to external systems via a transmission medium (e.g., network connection).

The one or more display devices 112 may include any display device known in the art. For example, the display devices 112 may include, but are not limited to, one or more head-down displays (HDDs), one or more HUDs, one or more multi-function displays (MFDs), or the like. For instance, the display devices 112 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 114 may include any user input device known in the art. For example, the user input device 114 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Figure 2:
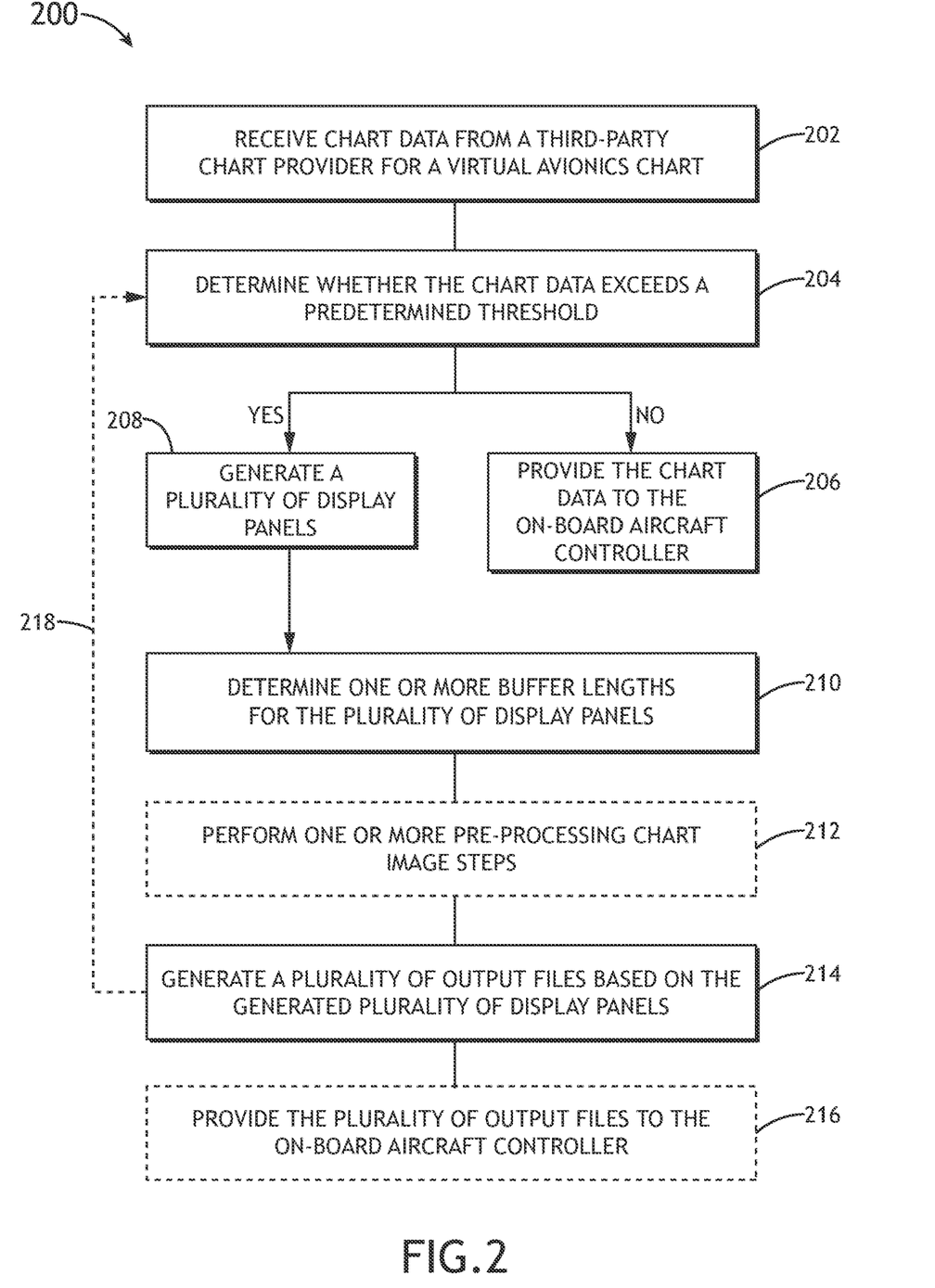
FIG. 2 illustrates a flowchart depicting a method or process for separating avionics charts into a plurality of display panels, in accordance with one or more embodiments of the present disclosure.
Figure 4:
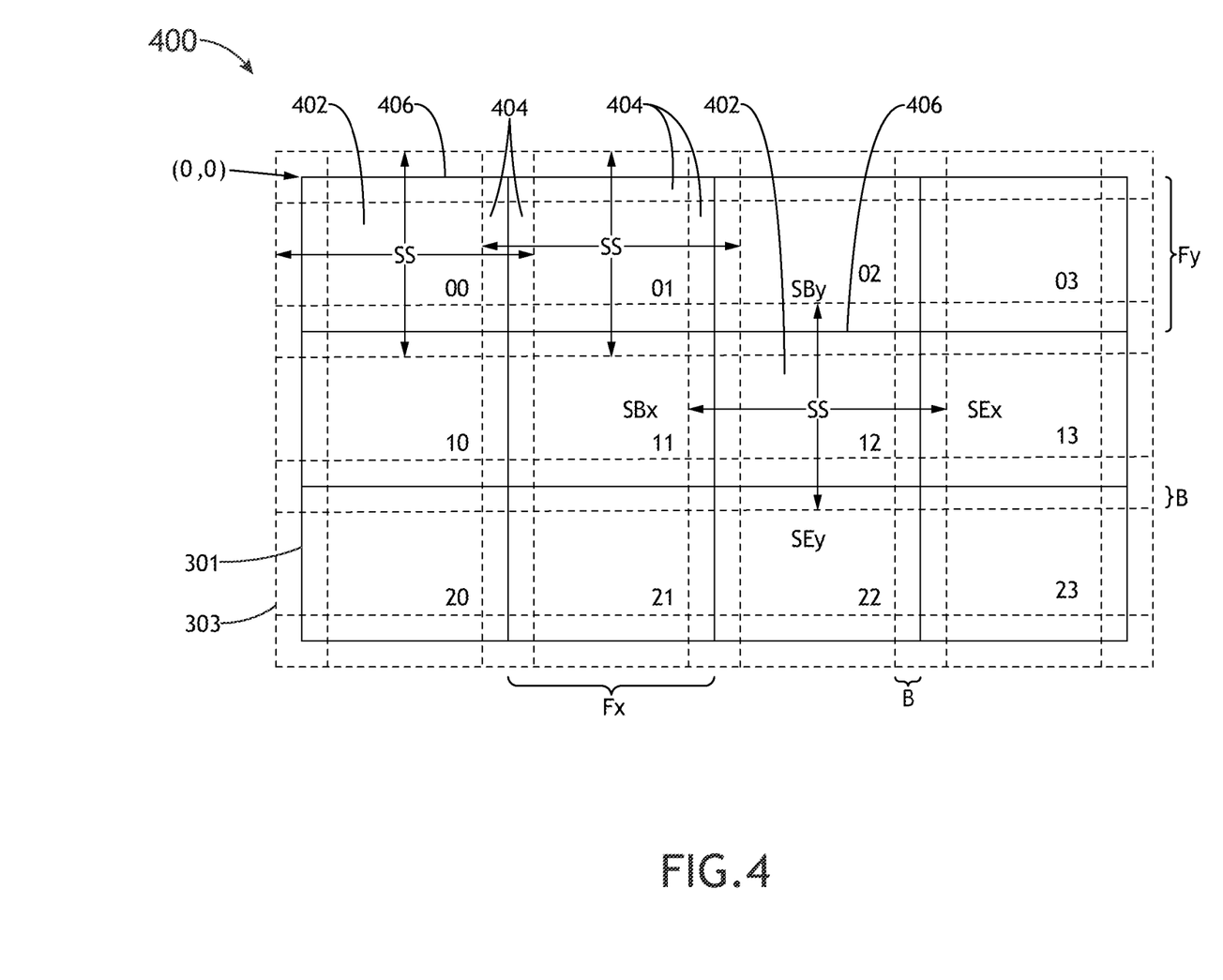
FIG. 4 illustrates a simplified schematic of an avionic chart separated into a plurality of display panels, in accordance with one or more embodiments of the present disclosure.
Figure 5:
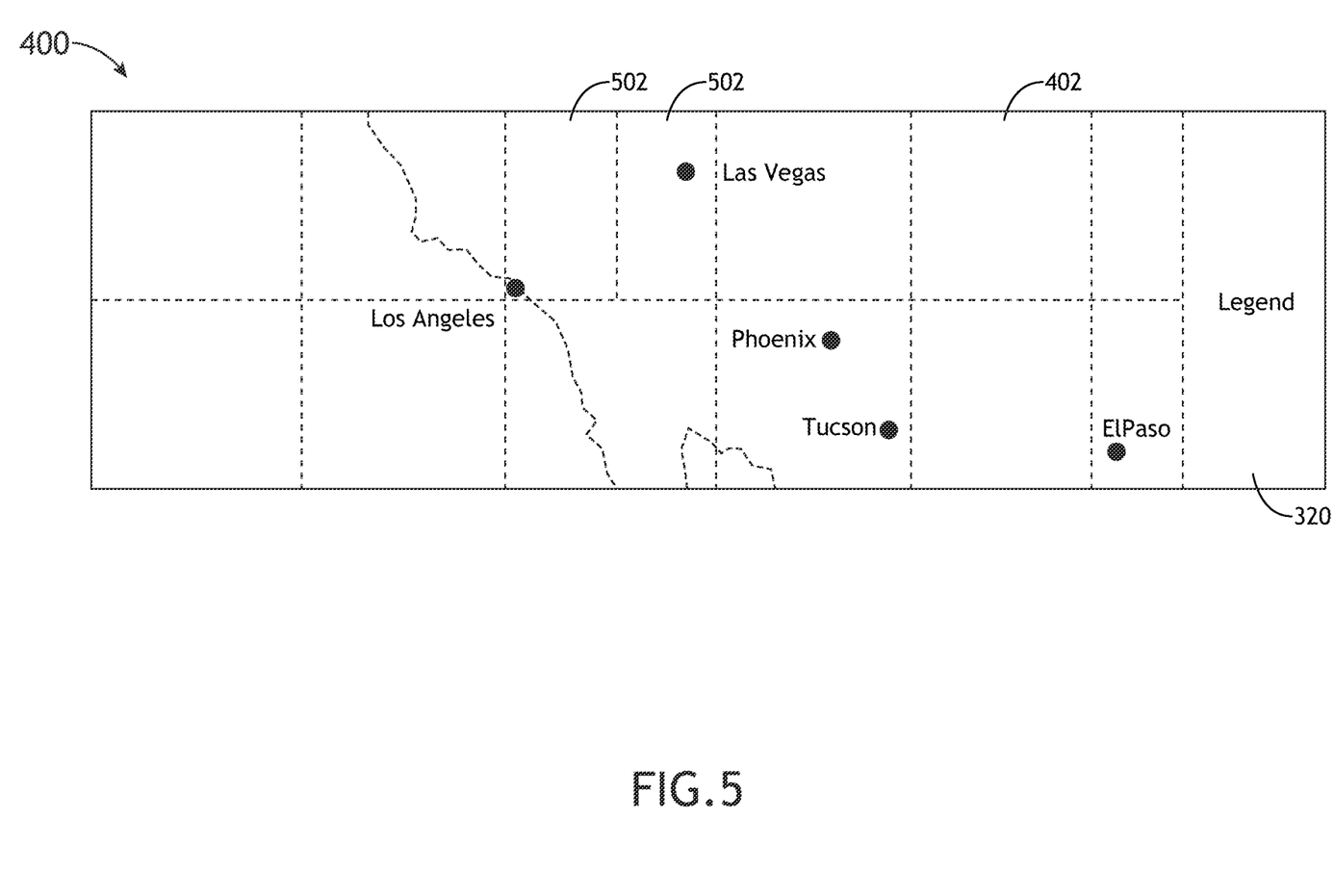
FIG. 5 illustrates a simplified schematic of an avionic chart separated into a plurality of display panels, in accordance with one or more embodiments of the present disclosure.

FIG. 2 illustrates a flowchart depicting a method or process 200 for separating large avionics charts into multiple display panels, in accordance with one or more embodiments of the disclosure. FIGS. 4-5 generally illustrate graphical representations of a plurality of display panels of a separated avionics chart, in accordance with one or more embodiments of the disclosure.

In a step 202, chart data may be received from a third-party chart provider. For example, the offboard controller 124 may be configured to receive chart data from a third-party chart provider. In one instance, the offboard controller 124 may be configured to receive enroute chart data from a third-party enroute chart provider. In another instance, the offboard controller 124 may be configured to receive terminal chart data from a third-party terminal chart provider.

It is noted that the offboard controller 124 may be configured to receive any type of chart known from any suitable third-party chart provider.

In a step 204, it is determined whether the received chart data exceeds a predetermined threshold. For example, the offboard controller 124 may be configured to compare a size of the received chart data to a predetermined threshold to determine whether the received chart data exceeds the predetermined threshold. In one instance, the offboard controller 124 may be configured to compare a data size of the received chart data to a predetermined chart data size threshold to determine whether the received chart data exceeds the predetermined chart data size threshold (e.g., whether the received chart data is too large in data size). It is noted that the predetermined chart data size threshold may be any threshold suitable for the display system. For example, the predetermined chart data size threshold may be between 1.2-1.5 Mb. For instance, the predetermined chart data size threshold may be 1.3 Mb.

If the received chart data size does not exceed the predetermined threshold (i.e., the data size is less than that predetermined threshold), then in a step 206, the chart data may be provided to the on-board aircraft controller 102 for display on the one or more display devices 112. In this regard, the chart is not separated into a plurality of display panels prior to display on the one or more display devices 112.

If the received chart data size exceeds the predetermined threshold (i.e., the data size is greater than that predetermined threshold), then in a step 208, a plurality of display panels 402 may be generated. It is noted that the display panels may be labeled using any labeling mechanism suitable for defining each individual display panel. The labels (e.g., 00, 01, 02, . . . ) shown in FIG. 4 are provided merely for illustrative purposes and shall not be construed as limiting the scope of the present disclosure.

Figure 3:
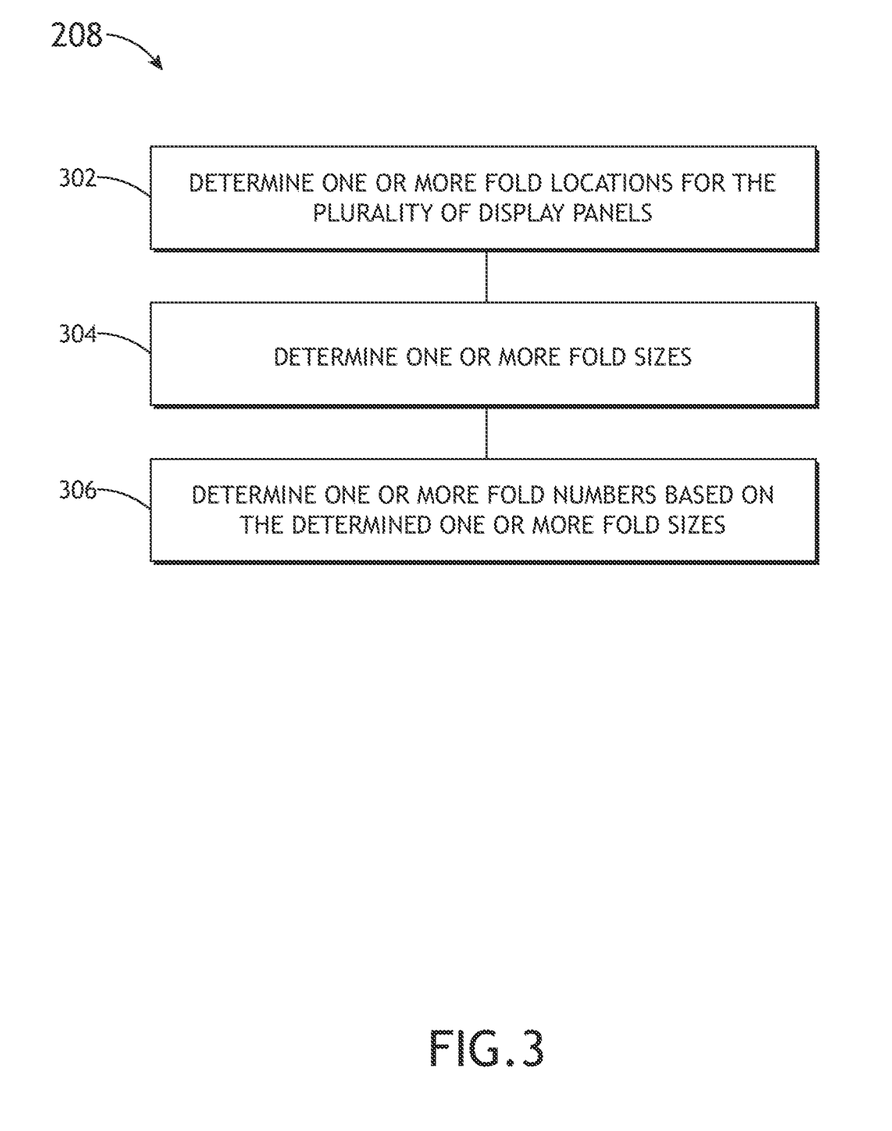
FIG. 3 illustrates a flowchart depicting a method or process for separating avionics charts into a plurality of display panels, in accordance with one or more embodiments of the present disclosure.

FIG. 3 illustrates a flowchart depicting a method or process 208 for generating the plurality of display panels, in accordance with one or more embodiments of the disclosure.

In a step 302, one or more fold locations may be determined. For example, the offboard controller 124 may be configured to generate a plurality of display panels 402 by determining one or more fold locations. For instance, the offboard controller 124 may be configured to adjust one or more dimensions of the received chart image 303 and determine a size of the adjusted image 301. In this regard, the offboard controller 124 may be configured to remove one or more portions of the received chart image (e.g., title page, legend, or the like) to generate an adjusted image and determine a size of the adjusted image.

In a step 304, one or more fold sizes may be determined. For example, the offboard controller 124 may be configured to determine an x-axis fold size ($F_x$) and further configured to determine a y-axis fold size ($F_y$). For instance, the offboard controller 124 may be configured to adjust the size of the adjusted image based on a folding algorithm. In this regard, the adjusted image may be divided by a predetermined fold size threshold (e.g., divided by 10 inches) to generate one or more pages (P) and a remainder (R). If the remainder (R) is less than a predetermined threshold, then the offboard controller 124 may be configured to distribute that amount to each page (P). At that point, each page may have a size of S+R/p. For example, S may be 10, P may be 5, and R may be 2 for a 52-inch wide chart, such that the panel size may be 10.4 inches (10+2/5). If the remainder (R) is more than 4, then the offboard controller 124 may be configured to add another page (P). For example, for a 57-inch wide chart, the chart may have five (5) panels of 10 inches and one (1) of 7 inches. It is noted that the aforementioned process may be performed for both the x- (horizontal) and y-axis (vertical).

Referring to FIG. 5, the fold size may be configurable. For example, where the virtual avionics chart includes a chart legend 320, the offboard controller 124 may be configured to determine a fold size based on the dimensions of the chart legend 320. For instance, where a panel includes data that exceeds a predetermined threshold, the offboard controller 124 may be configured to adjust the size of the panel to generate an adjusted panel 502 that is smaller than the original panel 402. For purposes of simplicity, FIG. 5 depicts only the panels 402, 502 of the chart 400. It is noted that FIG. 5 is provided merely for illustrative purposes and shall not be construed as limiting the scope of the present disclosure.

In a step 306, the offboard controller 124 may be configured to assign a fold number ($Fn_y$ below, $Fn_x$ below) based on the $F_x$ and $F_y$ values. For instance, the first value (e.g., $Fn_y$ below value) may represent the fold number down and the second value (e.g., $Fn_y$ below value) may represent the fold number across. It is noted that the y-value is given first because it facilitates that left-to-right reading of the numbers and many charts do not have horizontal folds.

Referring to FIG. 4, the offboard controller 124 may be configured to place each graphical object of the received chart into one or more sections (SS) by comparing the X and Y coordinates to Section Begin and End coordinates (e.g., $SB_{X/Y}$ and $SE_{X/Y}$). It is noted that objects may be placed in more than one section. The new coordinates of each object may then be determined. Given the fold number and the .svg X/Y position, the new X and Y positions follow.

Equations 1-4 are shown and described by:

When $Fnx=0$, New $X$ coordinate=$X$      Equation 1

When $Fnx!=0$, New $X$ coordinate=$X-FnxFx+B$      Equation 2

When $Fny=0$, New $Y$ coordinate=$Y$      Equation 3

When $Fny!=0$, New $Y$ coordinate=$Y-FnyFy+B$      Equation 4

For example, the offboard controller 124 may be configured to assign the left panel in each row an X index of zero, increasing by one across the row, as illustrated by Equation 1 (e.g., Fnx). By way of another example, the offboard controller 124 may be configured to assign the top panel in each column a Y index of 0, increasing by one down each column, as illustrated by Equation 3 (e.g., Fny). It is noted that together, Fny and Fnx make up the labels/cell numbers shown in FIG. 4 (e.g., 00, 01, . . . 23).

It is noted that the offboard controller 124 may be configured to receive data with positions based on the entire chart. However, the original position (X) may need to have a new position calculated (using Equation 2) because the panels are displayed independently. For example, in one illustrative example, X may be 35, Fnx is 3, Fx is 10, and B is 1, such that the new calculated X coordinate is 6. In this example, the line might start at an X location about 35 inches from the left edge, or about halfway across the fourth panel, such that the X of 35 inches would be at a position 5 inches into its panel if there was no buffer and it would be in the 4th panel over which is panel number 3 (e.g., Fnx=3) since they are zero based. Thus, with a 1 inch buffer the new coordinate would be 6.

In a step 210, one or more buffer lengths may be determined. For example, the offboard controller 124 may be configured to determine one or more buffer lengths (B) 404. For instance, as shown in FIGS. 4-5B, the offboard controller 124 may be configured to determine a buffer length 404 and add such buffer length 404 to each side of the display panel 402 to form a section 406. For purposes of the present disclosure, the term "buffer length" and variants thereof may be defined as an amount added to the virtual fold so that there is some overlap between adjacent display panels. Further, for purposes of the present disclosure, the term "section" and variants thereof may be defined as the display panel (e.g., displayed image of the fold) plus the buffer. It is noted that the section is what the offboard controller 124 products and stores as a displayable entity.

It is noted that the buffer length 404 may be any buffer length. For example, the buffer length 404 may be 1.00 inches.

Referring to FIG. 4, a first display panel 402 (e.g., display panel 00) may include a first buffer length 404 added to a first side of the display panel (e.g., left side of the display panel 00), a second buffer length 404 added to a second side of the display panel (e.g., top side of the display panel 00), a third buffer length 404 added to a third side of the display panel (e.g., right side of the display panel 00), and a fourth buffer length 404 added to a fourth side of the display panel (e.g., bottom side of the display panel 00), where the first display panel 402 (e.g., display panel 00) and the four buffer lengths 404 may form a first section 406. Continuing with this example, a second display panel 402 (e.g., display panel 01) may include a first buffer length 404 added to a first side of the display panel (e.g., left side of the display panel 01), a second buffer length 404 added to a second side of the display panel (e.g., top side of the display panel 01), a third buffer length 404 added to a third side of the display panel (e.g., right side of the display panel 01), and a fourth buffer length 404 added to a fourth side of the display panel (e.g., bottom side of the display panel 01), where the second display panel 402 (e.g., display panel 01) and the four buffer lengths 404 may form a second section 406. In this regard, a buffer length 404 is added around the perimeter of the display panels 402 (e.g., display panel 00 and display panel 01), such that there is some overlap between the adjacent sections 00, 01, respectively. In particular, as shown in FIG. 3, a user viewing display panel 00 may pan through the right buffer of the first panel 00 and the left buffer of the second panel 01, such that any chart data on either side of the fold line may be easily viewed.

In an optional step 212, one or more pre-processing chart image steps may be performed. For example, the offboard controller 124 may be configured to determine whether any part of the symbol (e.g., arrowhead, or the like) is in a section. If any part of the symbol is in a section then the offboard controller 124 may be configured to add a whole symbol. Further, the offboard controller 124 may be configured to apply a clipping region to restrict the symbol to a visual boundary.

By way of another example, the offboard controller 124 may be configured determine whether there is an embedded Clip Path for each group. If there is an embedded clip path then the offboard controller 124 may be configured to process the full related Path and convert to a set of clipped lines or a clipped shape. Further, the offboard controller 124 may be configured to process the full related path and convert the set of clipped lines (or clipped shape).

By way of another example, the offboard controller 124 may be configured to allocate the clipped lines or clipped shapes.

By way of another example, for each line Path, the offboard controller 124 may be configured to step through the Path, each line and arc command within the path comparing it to each set of section boundaries. If the start and end points of each line are within a section boundary, the offboard controller 124 may be configured to add the line command to the appropriate section(s). If the start and end points of each arc are within a section boundary, the offboard controller 124 may be configured add the arc to the appropriate section(s). If the radius and center of an arc would place part of it within a section boundary, the offboard controller 124 may be configured to add the arc to the appropriate section(s). It is noted that very long arcs can be broken at section boundaries if desired. If the start point of a line or the end point of a line is within a section boundary, but not both, the offboard controller 124 may be configured to clip the line at the section boundary (to remove very long lines from being drawn, if necessary). If the end point of a line or arc is outside a section, the offboard controller 124 may be configured to track the absolute coordinates in case the lines within the path re-enter the section.

By way of another example, for each fill Path, the offboard controller 124 may be configured to step through the Path. If the entire path is within a section, the offboard controller 124 may be configured to output the path. If the path enters or exits a section, the offboard controller 124 may be configured to mark the point on the section boundary. The offboard controller 124 may be configured to mark all entries and exits along a boundary. It is noted that these points are sorted and then connected with straight lines along the boundary to complete the shape within each section. Further, it is noted that sorting may be by y value when the break occurs along an x border and by x value when the break occurs along a y border. If the end point of a line or arc is outside a section, the offboard controller 124 may be configured to track the absolute coordinates to determine where the path re-enters the section. It is noted that the completed path may be unchanged or may be multiple paths separated across multiple sections. A method for fills may be generally discussed in concurrently filed U.S. Pat. No. 11,887,222, issued on Jan. 30, 2024, which is incorporated herein by reference in the entirety.

In a step 214, a plurality of output files are generated based on the separated plurality of display panels 402. For example, the offboard controller 124 may be configured to generate a plurality of output files including section data. For instance, the plurality of output files may be an SVG file.

In an optional step 216, the generated output files may be provided to the aircraft controller 102 for display on the one or more display panels 112. For example, the generated output files from the offboard controller 124 may be provided to the aircraft controller 102 via the communication interfaces 110, 134. A system and method for display of the panels may be generally discussed in U.S. Patent Publication No. 2023/0150685, published on May 18, 2023, which is incorporated herein by reference in the entirety.

In an optional step 218, prior to providing the plurality of output files to the on-board aircraft controller 102 (step 216), it is determined whether the chart data of the generated output files exceeds a predetermined threshold. If the chart data of the generated output file exceeds the predetermined threshold (as discussed previously herein), then the offboard controller 124 may be configured to break up at least a portion of the previously separated chart (using steps 208-216) such that the aircraft controller 102 may have ample storage to store/run the output file when displaying the chart.

For example, as shown in FIG. 5, the offboard controller 124 may be configured to break up the display panel 11 into two additional display panels 502. In this regard, each display panel 502 may be stored individually as its own separate chart, rather than stored as a single display panel.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the present disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A method for separating avionics charts into a plurality of display panels, the method comprising:
receiving chart data for one or more virtual avionics charts;
comparing a data size of the received chart data to a predetermined data size threshold to determine whether the received chart data exceeds the predetermined data size threshold;
in response to determining the received chart data exceeds the predetermined threshold, generating the plurality of display panels, wherein generating the plurality of display panels comprises:
determining one or more fold locations by removing one or more portions of the received chart data to generate an adjusted image;
determining one or more fold sizes of the adjusted image based on a folding algorithm, wherein the one or more fold sizes include an x-axis fold size and a y-axis fold size;
and assigning one or more fold numbers based on the x-axis fold size and the y-axis fold size;
determining one or more buffer lengths for the generated plurality of display panels, wherein the one or more buffer lengths have a physical length defined by at least one of a length in a x-direction or a length in a y-direction;
generating a plurality of sections by adding the one or more buffer lengths around a perimeter of each display panel of the plurality of display panels, wherein the one or more buffer lengths of the plurality of sections form one or more overlapping regions between at least a first section of the plurality of sections and a second section of the plurality of sections, wherein the second section is arranged adjacent to at least the first section;
and generating, via an offboard controller, a plurality of output files based on the generated plurality of sections.

2. The method of claim 1, further comprising: providing the plurality of output files to an on-board aircraft controller for display on one or more display devices of an aircraft.

3. The method of claim 1, wherein the predetermined data size threshold is between 1.2 Mb and 1.5 Mb.

4. The method of claim 3, wherein the predetermined data size threshold is 1.3 Mb.

5. The method of claim 1, wherein the physical length of the one or more buffer lengths is 1.00 inch.

6. The method of claim 1, further comprising: determining whether chart data of the generated plurality of output files exceeds the predetermined threshold; and upon determining the chart data of the generated plurality of output files for the one or more display panels exceeds the predetermined threshold, adjusting a fold size of the one or more display panels.

7. A system for separating avionics charts into a plurality of display panels, comprising:
one or more controllers including one or more processors configured to execute a set of program instructions stored in a memory, the set of program instructions configured to cause the one or more processors to:
receive chart data for one or more virtual avionics charts;
compare a data size of the received chart data to a predetermined data size threshold to determine whether the received chart data exceeds the predetermined data size threshold;
in response to determining the received chart data exceeds the predetermined threshold, generate a plurality of display panels, wherein the set of program instructions are configured to cause the one or more processors to:
determine one or more fold locations by removing one or more portions of the received chart data to generate an adjusted image;
determine one or more fold sizes, wherein the one or more fold sizes include an x-axis fold size and a v-axis fold size of the adjusted image based on a folding algorithm;
and assign one or more fold numbers based on the x-axis fold size and the v-axis fold size;

determine one or more buffer lengths for the generated plurality of display panels, wherein the one or more buffer lengths have a physical length defined by at least one of a length in a x-direction or a length in a y-direction;

generate a plurality of sections by adding the one or more buffer lengths around a perimeter of each display panel of the plurality of display panels, wherein the one or more buffer lengths of the plurality of sections form one or more overlapping regions between at least a first section of the plurality of sections and a second section of the plurality of sections, wherein the second section is arranged adjacent to at least the first section;

and generate a plurality of output files based on the generated plurality of sections.

8. The system of claim 7, wherein the one or more controllers are further configured to: provide the plurality of output files to an on-board aircraft controller for display on one or more display devices of an aircraft.

9. The system of claim 7, wherein the predetermined data size threshold is between 1.2 Mb and 1.5 Mb.

10. The system of claim 9, wherein the predetermined data size threshold is 1.3 Mb.

11. The system of claim 7, wherein the controller is further configured to: determine whether chart data of the generated plurality of output files exceeds the predetermined threshold; and upon determining the chart data of the generated plurality of output files for the one or more display panels exceeds the predetermined threshold, adjusting a fold size of the one or more display panels.

12. The method of claim 1, wherein the plurality of output files includes one or more scalable vector graphic files.

13. The system of claim 7, wherein the plurality of output files includes one or more scalable vector graphic files.

\* \* \* \* \*